United States Patent [19]

Ross

[11] 4,149,455
[45] Apr. 17, 1979

[54] ELECTRIC POP CORN POPPER

[76] Inventor: Michael M. Ross, 884 Ameku, Naha, Okinawa, Japan, 900

[21] Appl. No.: 887,680

[22] Filed: Mar. 17, 1978

[51] Int. Cl.² .............................................. A23L 1/18
[52] U.S. Cl. ................................. 99/323.5; 99/348; 366/247
[58] Field of Search ............... 99/323.5, 323.8, 323.4, 99/348, 357; 219/436, 438; 366/244, 245, 247, 248, 251

[56] References Cited

U.S. PATENT DOCUMENTS

| | | | |
|---|---|---|---|
| 912,136 | 2/1909 | Landry | 366/247 |
| 1,304,508 | 5/1919 | Petro | 366/247 |
| 1,617,643 | 2/1927 | Kriete | 366/247 |
| 1,620,765 | 3/1927 | Jackson | 366/247 |
| 1,642,531 | 9/1927 | Barnard | 366/144 |
| 1,646,858 | 10/1927 | Grossenbacher | 366/325 |
| 2,034,190 | 3/1936 | Platt | 219/436 |
| 2,150,888 | 3/1939 | Barnard | 366/247 |
| 2,441,941 | 5/1948 | Shafter | 366/146 |
| 2,505,966 | 5/1950 | Humphrey | 366/248 |
| 2,561,203 | 7/1951 | Joffe | 366/248 |
| 2,570,126 | 10/1951 | Hobbs | 366/248 |
| 3,666,499 | 5/1972 | Isnor | 99/323.5 |

*Primary Examiner*—Robert W. Jenkins
*Attorney, Agent, or Firm*—Blair, Brown & Kreten

[57] ABSTRACT

Disclosed herein is an apparatus for cooking which enjoys the duality of not only accommodating conventional cooking, but also provides a specific apparatus for the efficient cooking and preparation of various kinds of conventional and exotic pop corn recipes. When used in conventional cooking, the apparatus without the translucent lid according to the present invention corresponds to conventional cookware, but for the cooking of pop corn, the apparatus provides a translucent cover portion, insulating means between this cover and the lower pan portion, and an air gap disposed therebetween. The stirring attachment is suitably formed to not only stir the pop corn while it is being cooked, but also features a removable handle in which a forked extremity of a portion of the stirring attachment serves to provide a nesting area to remove the hot stirrer from the lid. A lid locking device serves to stabilize the lid's disposition on the lower pan element and ventilation is provided along the inner face between the handles and the area that supports the lid.

11 Claims, 14 Drawing Figures

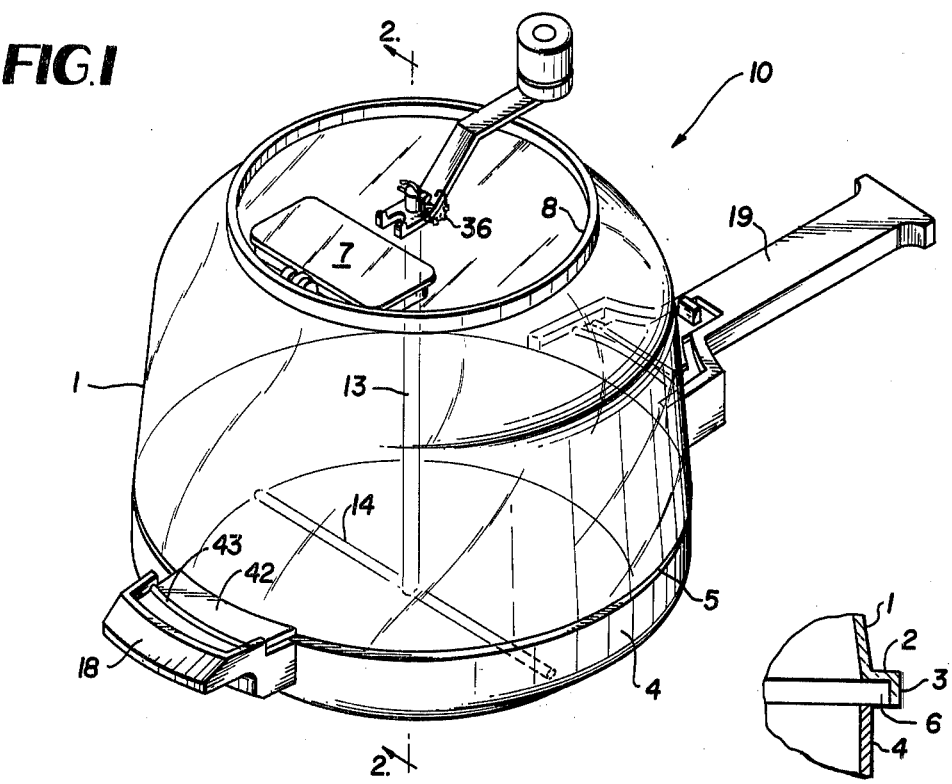
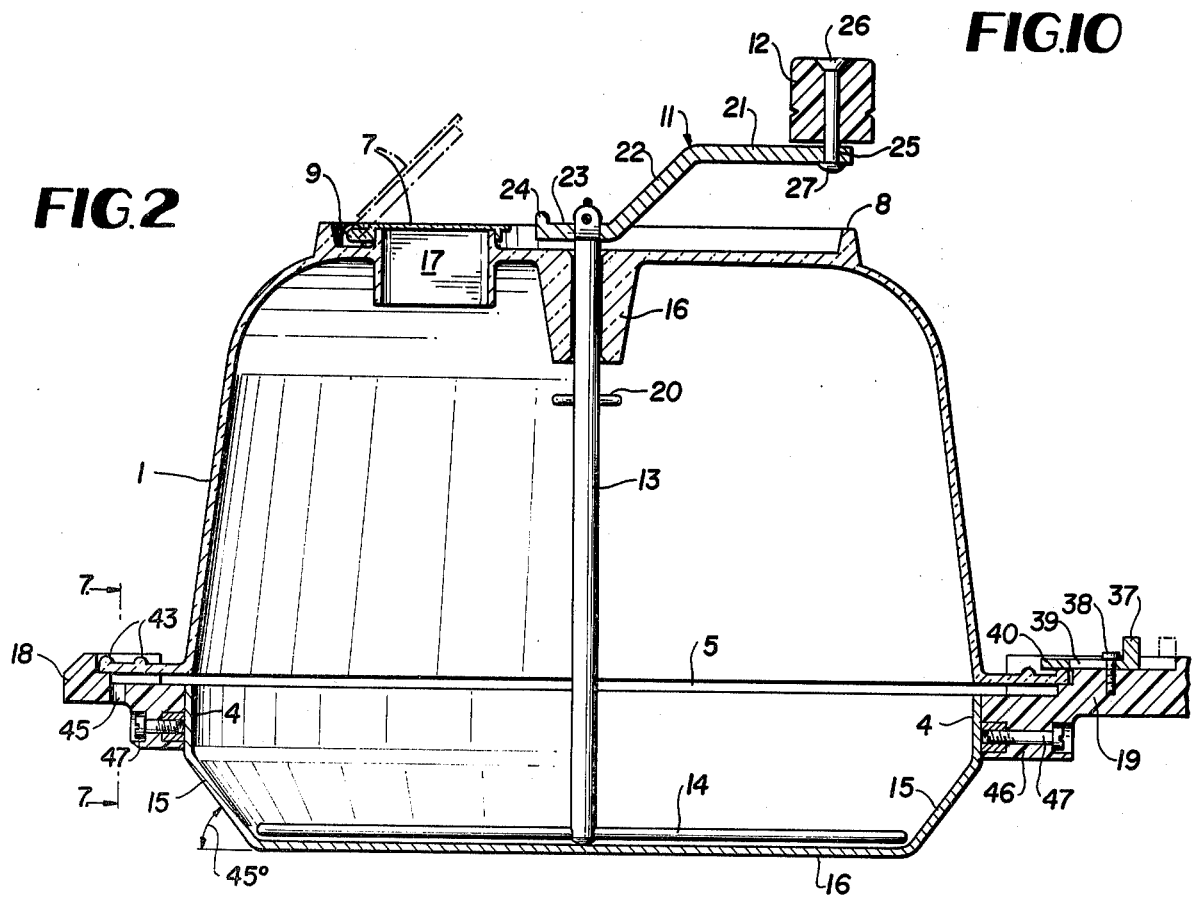

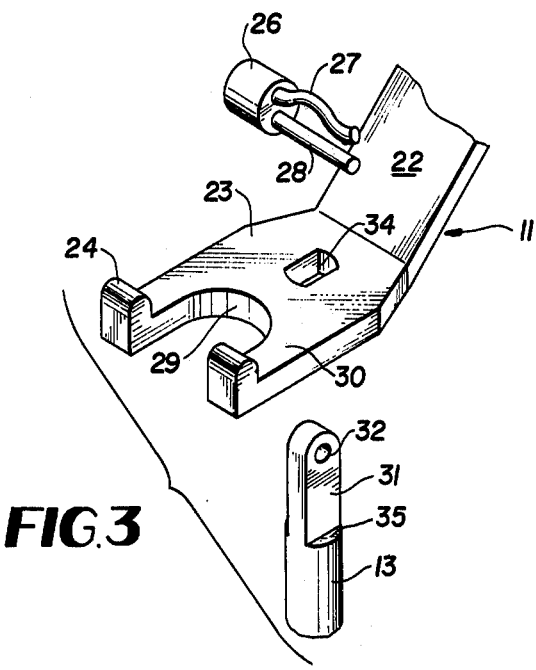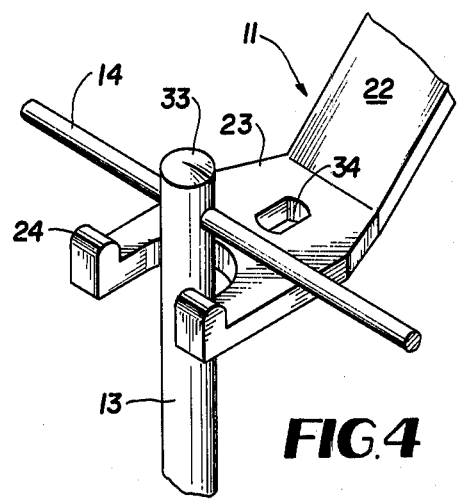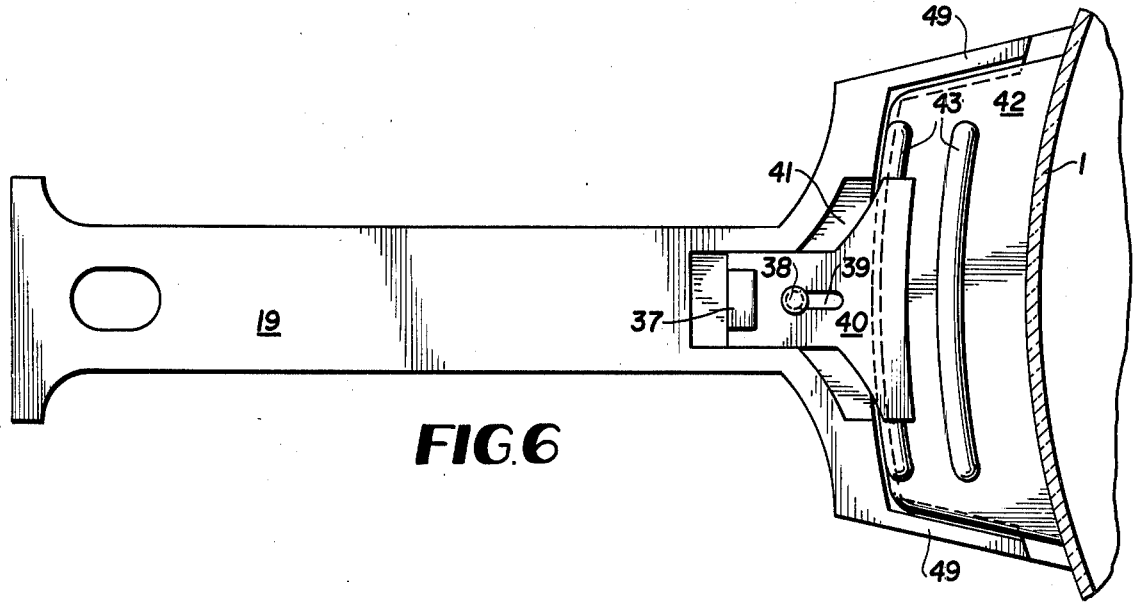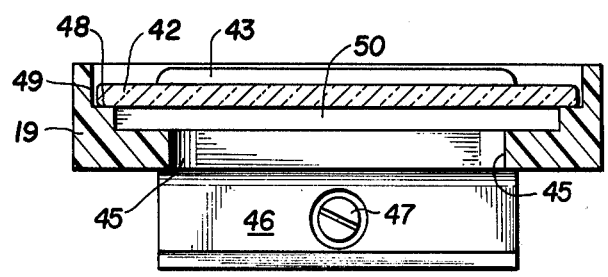

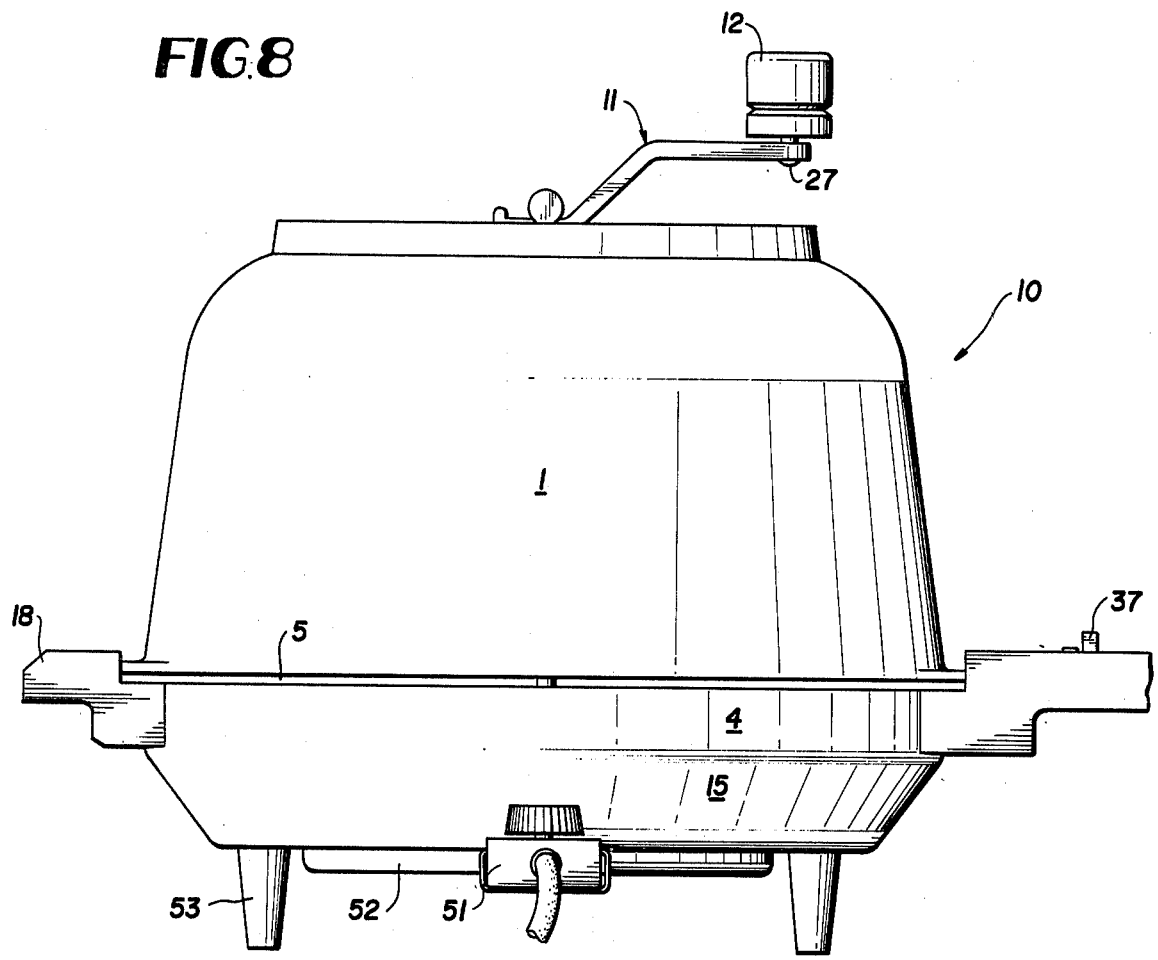
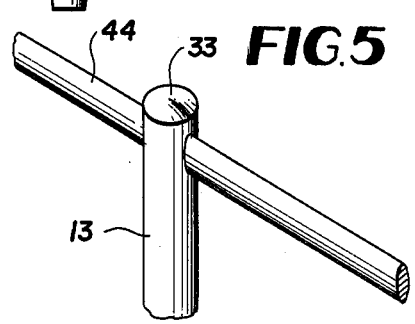
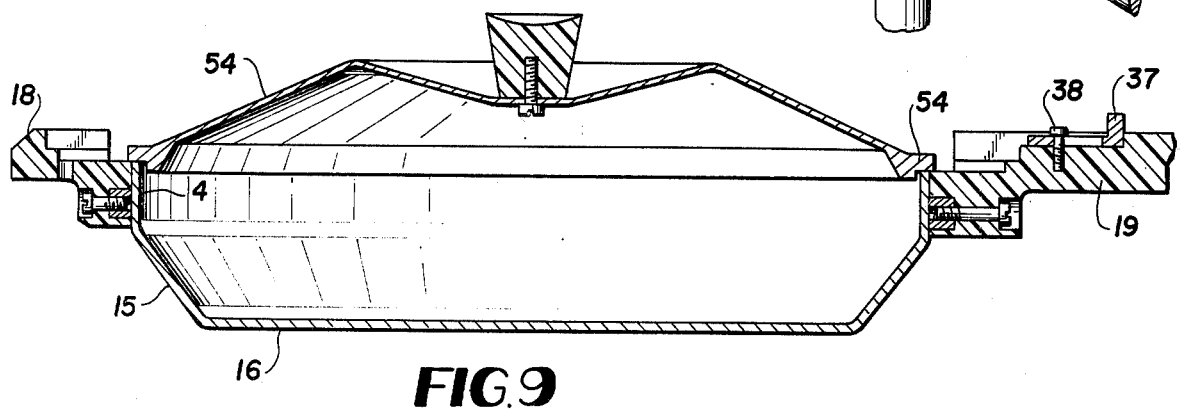

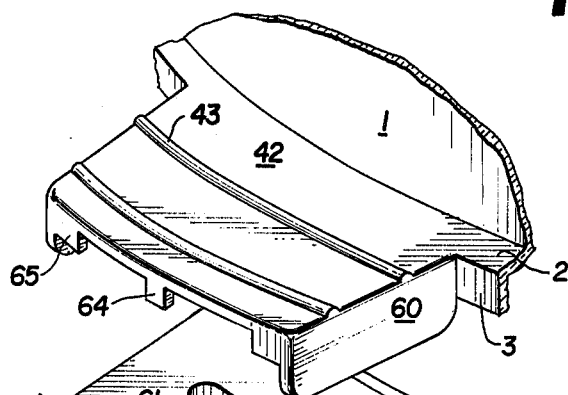
FIG.11
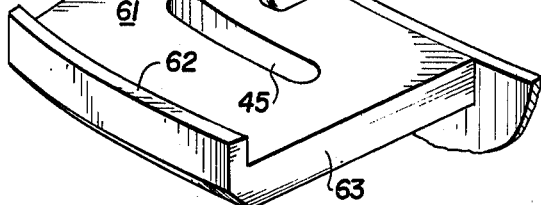
FIG.13
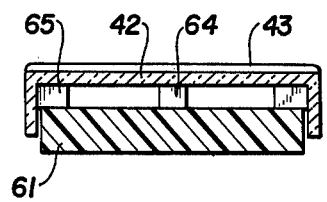
FIG.14
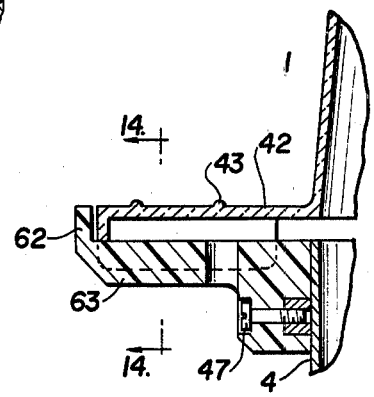
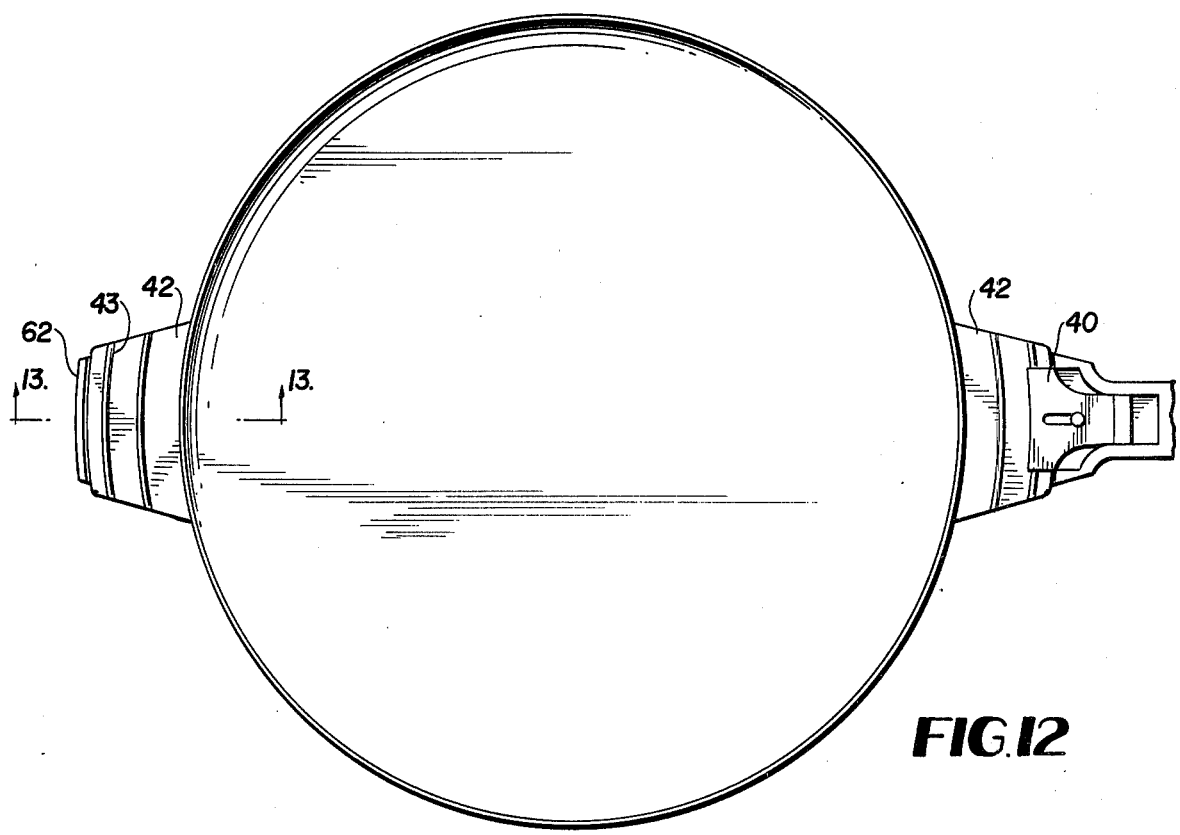
FIG.12

ELECTRIC POP CORN POPPER

BACKGROUND OF THE INVENTION

The concept of stirring pop corn while it is cooking is fairly old in the art as evidenced by the following patents Nos:
912,136 Landry
1,304,508 Petro
1,617,643 Kriete
1,620,765 Jackson
1,642,531 Barnard
1,646,858 Grossenbacher
2,034,190 Platt
2,150,888 Barnard
2,441,941 Shafter
2,505,966 Humphrey
2,561,203 Joffe
2,570,126 Hobbs These specific structures, however, can perhaps be best categorized by noting that the structure intrinsic with each of these references necessitates that the cooking appliance with it's lid is compatible only for pop corn cooking and does not lend itself to the convenient cooking of conventional foods as in conventional cookware.

Specifically noteworthy is the Humphrey U.S. Pat. No. 2,505,966, in which the stirring attachment is shown to be comprised of components which are capable of disassembly, but does not provide integrally and simultaneously a mechanism for removing the stirring wand from the lid, and further, the lid cannot serve as the container to hold the cooked pop corn. Therefore an additional bowl or receptacle is necessary.

Similarly, the patent to Jackson, U.S. Pat. No. 1,620,765 shows a lid latching mechanism coincidentally similar with that of the instant application, but the lid structure and stirring mechanism does not lend itself to utilization as the receptacle for pop corn that has been cooked. In addition, however, the lid of this structure must be formed from a material capable of standing the high heat of cooking and therefore does not seem to be competitive with the apparatus according to the instant application either in cost production, flexibility, or elegance.

It is to be noted that the remaining patents of which undersigned is aware do not remedy any of the deficiencies noted specifically for the above two discussed patents, but rather can be characterized in their degree of specialization for solely cooking pop corn.

SUMMARY AND OBJECT OF THE INVENTION

Accordingly, the following detailed specification contemplates providing a pop corn popper which is also usable as a conventional fry pan, and therefore afford the cooking utensil purchaser a wider degree of flexibility than the prior art. In addition, however, the following ensuing specification contemplates providing a pop corn popper in which the cover for the frying pan is also capable of serving as a receptacle for the cooked pop corn. To this end, a removable handle which serves also as the stirrer is provided with a unique configuration which allows the removal of the extremely hot stirring rod immediately after the pop corn has been cooked and is therefore disassembleable from the cooking cover. Further, since the cover is to be made from a translucent material having a low melting point relative to the metallic structure of the frying pan, insulation means must be provided between the cover and the frying pan to reduce the likelihood of deforming the cover.

It is to be noted that the air space not only serves as a buffer to prevent the lid from melting, but also provides a vent for escaping steam. Steam has to escape in order for popcorn to pop to highest quality. A dual purpose of the air space is to provide protection from high temperatures and from the steam vent.

These and other objects will be made manifest when considering the following detailed specification and appended drawings, in which:

BRIEF DESCRIPTION OF THE DRAWINGS

FIG. 1 shows an isometric view of the apparatus according to the present invention.

FIG. 2 is a sectional view taken along lines 2—2 of FIG. 1.

FIG. 3 is a detailed exploded parts view of the handle locking mechanism.

FIG. 4 shows the adaptability of the structure in FIG. 3 for serving to remove the stirring wand.

FIG. 5 shows an alternative embodiment and construction for the stirring wand.

FIG. 6 is a top plan view of the long handle showing the locking latch mechanism structure.

FIG. 7 is a sectional view taken along lines 7—7 of FIG. 6.

FIG. 8 is a side view of the pop corn popper utilizing an electrical heating element.

FIG. 9 is a sectional view depicting the conventional frying pan arrangement that the instant invention is convertible to.

FIG. 10 shows a sectional embodiment of an alternative construction for the inner face between the lid and the pan.

FIG. 11 shows an alternative cover-handle interlock.

FIG. 12 is a top view thereof with the cover central details omitted for simplicity.

FIG. 13 is a sectional view taken along lines 13—13 of FIG. 12.

FIG. 14 is a sectional view taken along lines 14—14 of FIG. 13.

BRIEF DESCRIPTION OF THE PREFERRED EMBODIMENT

Referring to the drawings now where like reference numerals refer to like parts throughout the various drawings, reference numeral 10 is generally directed to the corn popper according to the present invention.

The corn popper may generally be regarded as having upper and lower portions in which the lower portion may generally be regarded is comprising a conventional frying pan suitable for cooking many types of foods. The pan structure itself ideally would have a bottom portion 16 and a sloping side wall 15 which can exceed the bottom of the pan 15 with a vertical side wall 4. Diametrically opposed disposed on the frying pan outer surface proximate to the vertical wall 4 are a pair of handles 18 and 19 whose structure will be delineated hereinafter.

The upper portion or cover of the frying pan cooker and pop corn maker is generally of dome shape and it's cover 1 has a vertically upstanding circumferential rib 8 disposed on the top portion thereof to serve as a nesting surface when the cover is to be inverted and serve as a receptacle for the cooked pop corn. The top face of the cover 1 has also disposed thereon a hinged door 7 in which the hinge element is denoted by reference numeral 9. This door 7 communicates with a passageway 17 which serves to permit the ingress of either pop corn or butter, or any other flavoring as is desired by the user. In one embodiment, an inner portion proximate to the top of the cover has a support structure 16 which serves as a guide and a constraint for the stirrer 13. The stirrer is generally regarded as having a vertical shaft 13 and at the terminal point remote from the stirring handle the stirring rod 14 is disposed therein through a hole. FIG. 4 best depicts the interaction of the stirrer 14 and the vertical shaft 13. FIG. 5, contemplates providing the stirrer with an ovaloid end of stirring rod (rounded surfaces 44), and it is to be noted that the terminal portion of the vertical rod 13 has a rounded configuration 33 so that in use with pans having a teflon coating, the rounded surface tends to reduce the likelihood that the teflon will be scarred. As seen in FIG. 2, the actual stirrer 14 runs the entire diameter of the bottom of the pan 16 and the curved portion 15 of the pan (disposed at an angle relative to the horizontal at 45° or greater) engages the entire horizontal face of the pan. This is desirable to decrease the likelihood that stirred kernels will not tend to migrate up the sides of the pan. Disposed on shaft 13 proximate to the guard 16 is a metal pin 20 or washer affixed to stirring rod 13 which makes sure that as the pop corn pops, the stirrer 14 will stay on the bottom of the pan and not tend to rise upwardly.

The structure of the stirring handle can now be described. The handle 11 has disposed at one extremity a knob 12 supported on the handle by means of pin 26 disposed in the handle through an opening 25 at the extremity remote from the vertical shaft 13. The handle comprises a generally planar portion 21, an angulated portion 22 extending towards the stirrer 13, and a second horizontal portion 23 which has a pair of vertically upstanding tips 24 at the extremity of the handle remote from the knob 12. In addition, however, there is a U-shaped recess 29 disposed proximate to these tips so as to form a substantially U-shaped cut away recess and the purpose thereof will be made manifest shortly. In addition, however, on the horizontal portion 23 there is a second opening 34 defined by two parallel faces and two opposed curved surfaces which define a semi rectanguloid opening which allows the stirring rod 13 to be inserted therethrough. The portion of the stirring rod to be inserted into the handle element through hole 34 has two flattened sides 31 which correspond to the two flattened sides of the hole 34 and a stepped shoulder 35 which limits the travel of the vertical stirrer 13 into the hole 34. The topmost extremity of this stirring rod 13 has a hole 32 disposed therein for connection with a retaining pin which can be generally regarded as having a handle portion 26, a horizontally disposed shaft 28 and a curved spring element 27 which rides over the terminal portion of the stirrer while the shaft 28 is inserted into hole 32. Ideally, the handle portion 26 can have a chain disposed thereon or other type of flexible tether 36 (FIG. 1) fastened to handle 11 in a manner well known in the art. In use and operation, therefore, once the pop corn has been popped, the handle 11 is removed from the stirrer 13 by removal of it's locking clip 26, 27, 28 from the hole 32 in the vertical rod 13 and the handle is then free to be disassociated from the vertical rod 13. The pop corn lid is inverted to serve as the receptacle for the pop corn that has been popped and the frying pan is removed from the receptacle. FIG. 4 shows the use of the handle now in its function to remove the stirrer which obviously will be quite hot. The vertical rod 13 engages in the U-shaped recess 29 and the legs formed by the U-shaped recess 30 in conjunction with the upstanding tips 24 engage the T-shaped stirring element 14 and vertical rod 13 as shown in FIG. 4. Once the handle has been oriented in this position, the hot stirring device can be removed.

In the popping operation, it is apparent that use of the stirring rod through the handle 11 and the force of the exploding kernels against the inner face of the cover 1 will tend to at least increase the likelihood that the cover may become displaced and to this end, a novel latching mechanism is now to be discussed so as to assure that the cover will remain on the frying pan during the cooking operation. The long handle 19 is shown to have, in FIG. 6, a T-shaped recess portion 41 proximate to the handle's fastening to the pan. Overlying this recess 41 is a T-shaped (similarly formed) sliding latch 40 constrained to ride in this T-shaped trackway by means of a fastening pin 38 disposed in the handle and extending through slot 39 on the latch 40. An upstanding projection 37 serves as the trigger which can slide the element 40 backwards and forwards. In the fore position (proximate to the pan), a handle portion of the cover 1 is disclosed. The handle portion 42 may have upwardly extending ribs 43 which lie underneath the T-shaped latch 40. The handle 42 is supported on handle 19 and constrained from rotation by upstanding lip members 49 disposed on the handle 19 and rest on the handle at shelf 48 or, ribs on lid handle may be used as spacer instead of shelf, as seen in FIG. 7. The handle has a lower vertical face 46 in which a fastening element 47 is used to lock the handle to the pan. By having the lid handle 42 supported on shoulder 48, an air space 50 is provided below the handle 42 and this air space 50 communicates with holes 45 which serve as a means for allowing heat to be dissipated therefrom. The handle 19 is fashioned from any conventional insulative material such as phenolic and therefore does not conduct the heat with the same degree as the frying pan itself, and this is important since if the cover 1 is to be made of lexan or any similar plastic material, it is important that the cover be removed from the lip of the frying pan and to this end, two embodiments are to be discussed hereinafter. It is to be noted in FIG. 1 that around the entire periphery of the pan at the juncture between the lid 1 and the vertical wall 4, there is an air space 5 which serves to insulate and isolate the lexan cover from the frying pan and its associated heat. In addition, however, FIG. 10 contemplates an additional embodiment in which the cover is provided with a horizontally outstanding rib 2 having a vertically downwardly extending rim 3 remote from the vertical wall 4 of the frying pan so as to provide the air space 6 of FIG. 10. This is important, since in some recipes in which sugar coated pop corn is to be made, the popping of the corn will cause splattering of hot sugared oil and serious burns can result if there is not a deflector 3 disposed on the lid so as to direct any hot oil sugar combinations in a downward direction rather than outward.

The short handle diametrically opposite from the long handle 19 bears reference numeral 18 and can generally be regarded as serving as a nesting area for the second handle 42 of the cover 1. It has a cutaway portion basically as shown in FIG. 7, and an outer wall 49 serves to similarly constrain the lid from rotation or reaction to the handle's rotating action when the stirrer is used. The structure of this short handle 18 is similar to that shown in FIG. 7 but it is to be noted that the locking element 40 is not necessary on this side of the handle.

FIG. 8 shows an additional embodiment in which the frying pan is provided with an electrical cooking grid or element and the electrical cooking element is disclosed as by the reference numerals 51 and 52. In ths case, of course, legs must be provided to remove the bottom face of the cooking pan from the surface supporting it and the legs are denoted by the reference numeral 53. The thermostat 51 controls the amount of heat being provided into the electrical heating element 52. FIG. 9 shows the apparatus according to the present invention utilizing a conventional cooking top and it is to be noted that in this case where a conventional metallic cover is to be deployed, it is not necessary to have the latched locking mechanism operational or to have the pan and the lid be separated by an air space.

FIGS. 11–14 show a handle-cover locking relationship that constitutes an alternative structure. The latch mechanism 40 is the same as before but now ribs 43 on tab 42 terminate in downwardly extending lip segments 60. These lip segments overlie the end portion 63 of both long and short handles 61. The air hole 45 is still present for cooling as well as the air space 5 on the cover (2, 3) lip to provide a steam vent and protect the plastic cover 1 from the frying pan heat. Depending ribs 65 and 64 lift 42 away from 61, and the upturned lip 62 of the handle 61 prevents lateral displacement of the cover.

Having thus described the invention, it will be apparent that numerous structural modifications are contemplated as being a part of this invention as delineated hereinbefore and as specified hereinbelow by the claims.

I claim:

1. A cooking appliance of the type having a lid a bottom cooking pan and a stirring device to agitate objects to be cooked disposed in the bottom of the pan comprising a stirring handle having a horizontal portion connectable to said stirring rod in which said horizontal portion has a U-shaped recessed area and upstanding tip members and said stirring handle is removable from said vertical stirring rod and the tip members and recessed area above to provide a nesting surface for the removal of the stirring rod at a point opposite from the connection between the vertical rod and the horizontal portion.

2. The device of claim 1 in which said cover is provided with an air space between said cover and said pan.

3. The device of claim 2 in which the air space is formed by a pair of handles, ledges disposed on said handles which support said cover above the top periphery of said pan.

4. The device of claim 3 in which ventillation holes and an air space are provided below the handle portion of said cover proximate to said handle disposed on said frying pan.

5. The device of claim 4 in which said air space that runs around the entire periphery of the cover is provided with a horizontal shelf portion connected to said cover and a downwardly extending lip connected to said shoulder so as to provide an air space between the wall of the frying pan and the cover.

6. The device of claim 5 in which the handle portion of said cover is provided with upstanding ribs which engage a latch mechanism disposed on the handle.

7. The device of claim 6 in which said latch mechanism is generally a T-shaped sliding element disposed in a trackway on said handle having a trigger to facilitate translation of said latch.

8. The device of claim 7 in which said cover is provided with a annular rib on the top face thereof to serve as a support for the cover when it is in its inverted position and is used as a receptacle.

9. The device of claim 8 in which said top face of said cover is provided with an access port to allow the ingress of articles to be cooked.

10. The device of claim 9 in which said stirrer is fastened to said handle by means of a hole disposed in said stir rod, a rod oriented to be inserted therethrough, and a resilient locking clip disposed on the handle portion of said rod which serves to lock the vertical stirring rod to said handle.

11. The device of claim 5 in which the handle portion of said cover comprises a planar surface nestable on said frying pan handle and further includes downwardly extending tabs which straddle opposed sides of said frying pan handle.

* * * * *